Feb. 13, 1962   G. A. OLOFSSON ETAL   3,020,966
AUTOMATIC WEIGHING MACHINE
Filed Nov. 7, 1955   9 Sheets-Sheet 5
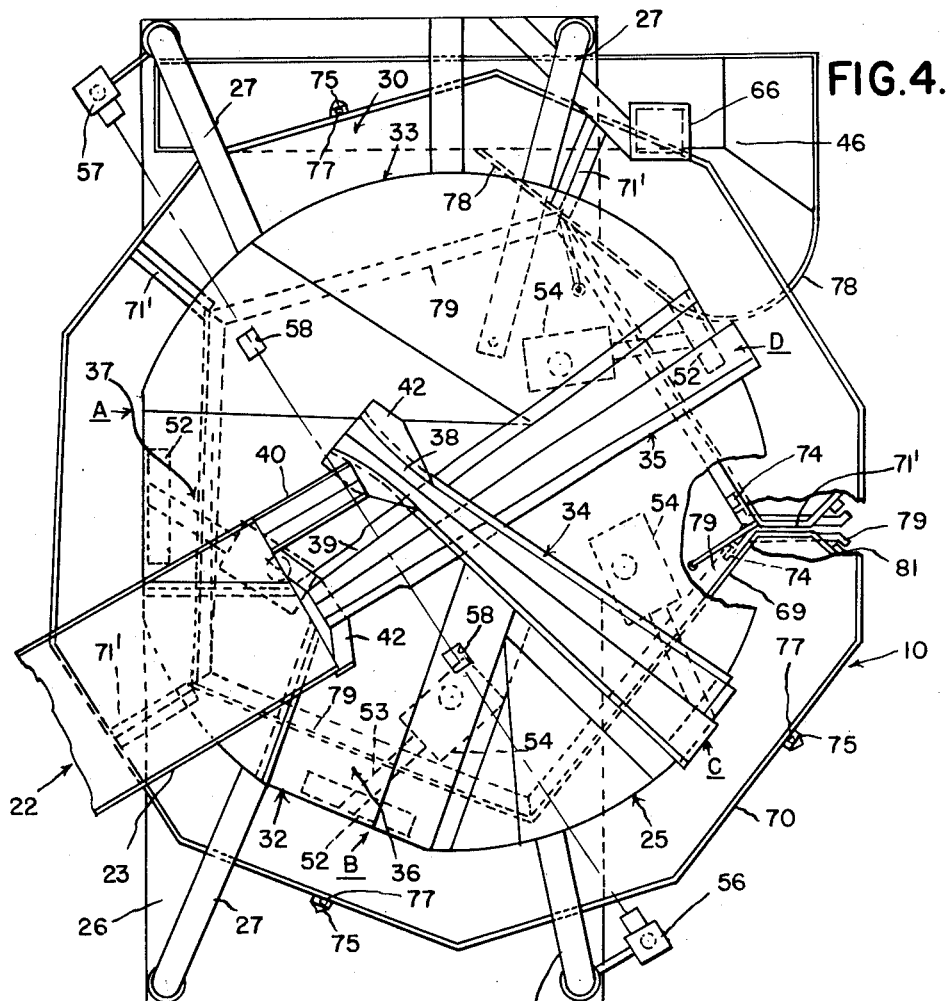
INVENTORS
GUSTAV A. OLOFSSON
BY DONALD W. GARNETT
Whittemore, Hulbert &
Belknap ATTORNEYS Feb. 13, 1962  G. A. OLOFSSON ETAL  3,020,966
AUTOMATIC WEIGHING MACHINE
Filed Nov. 7, 1955

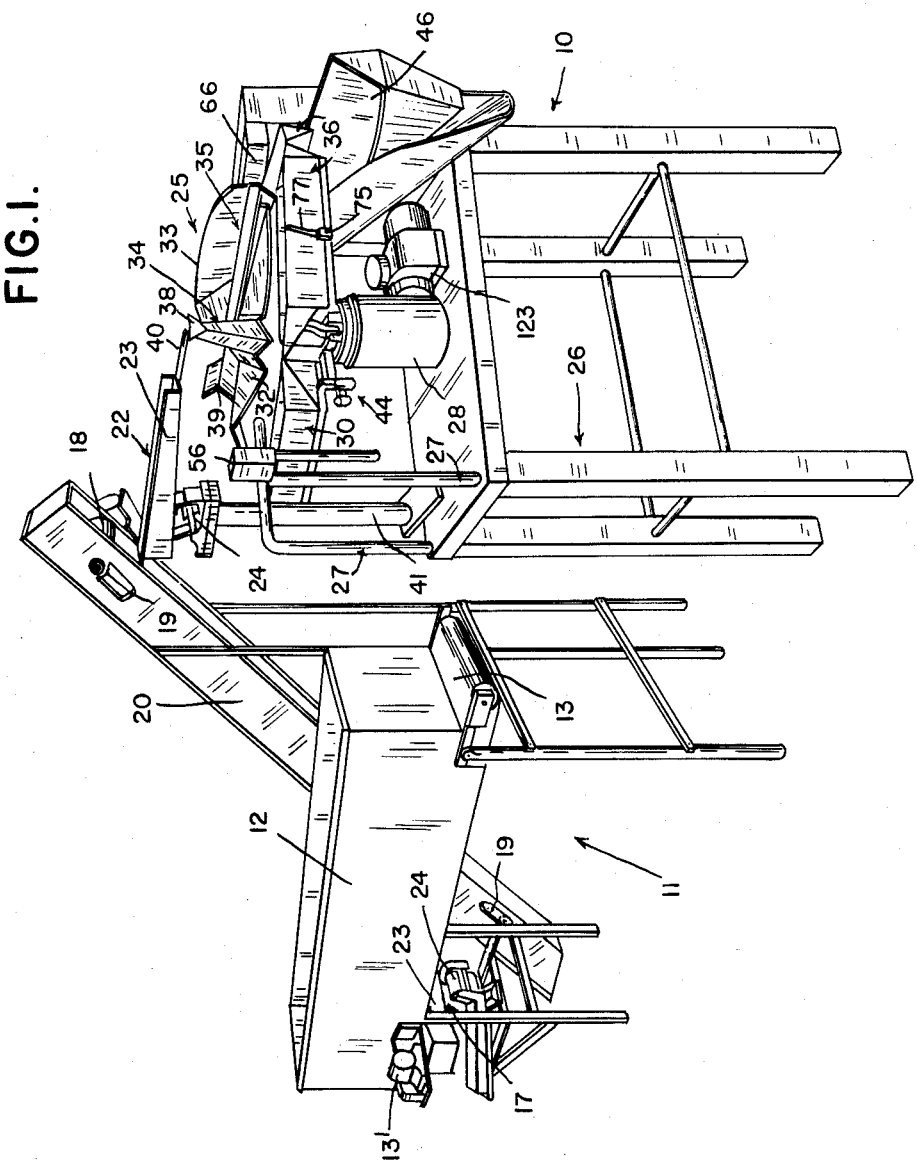

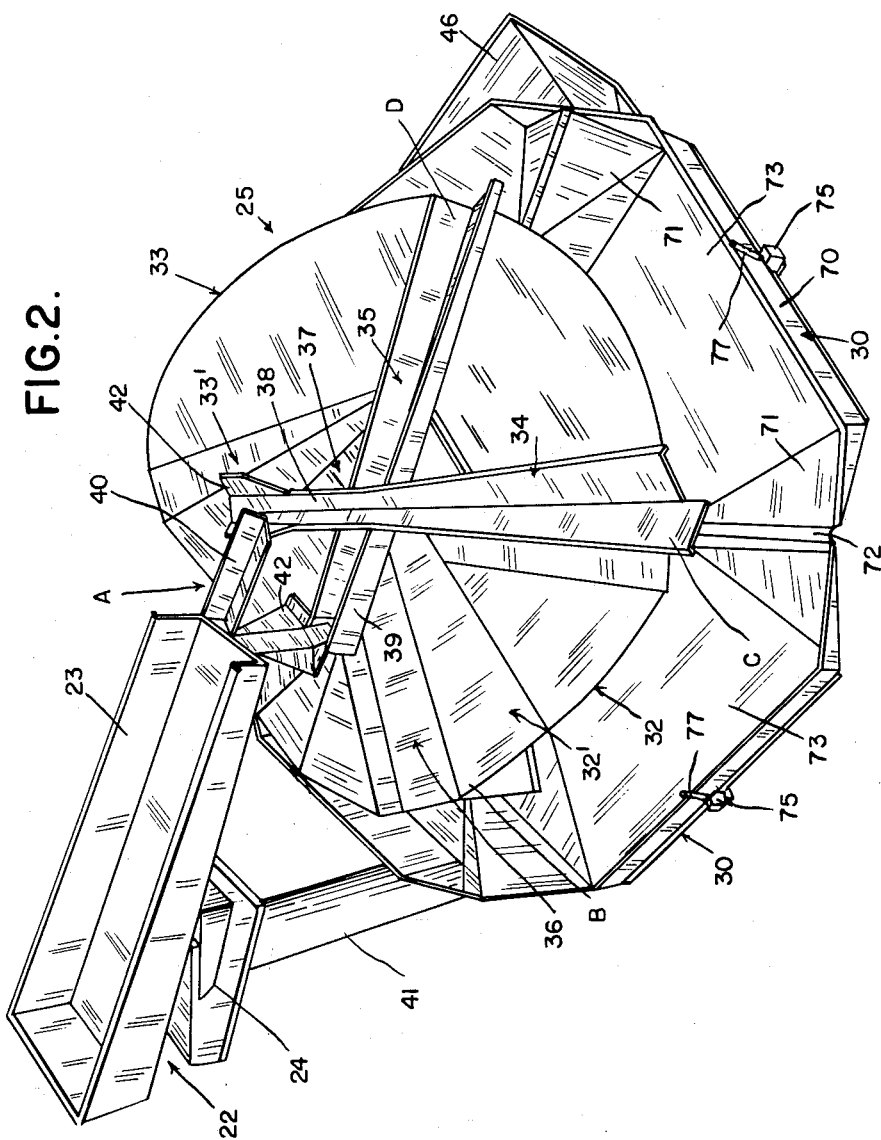

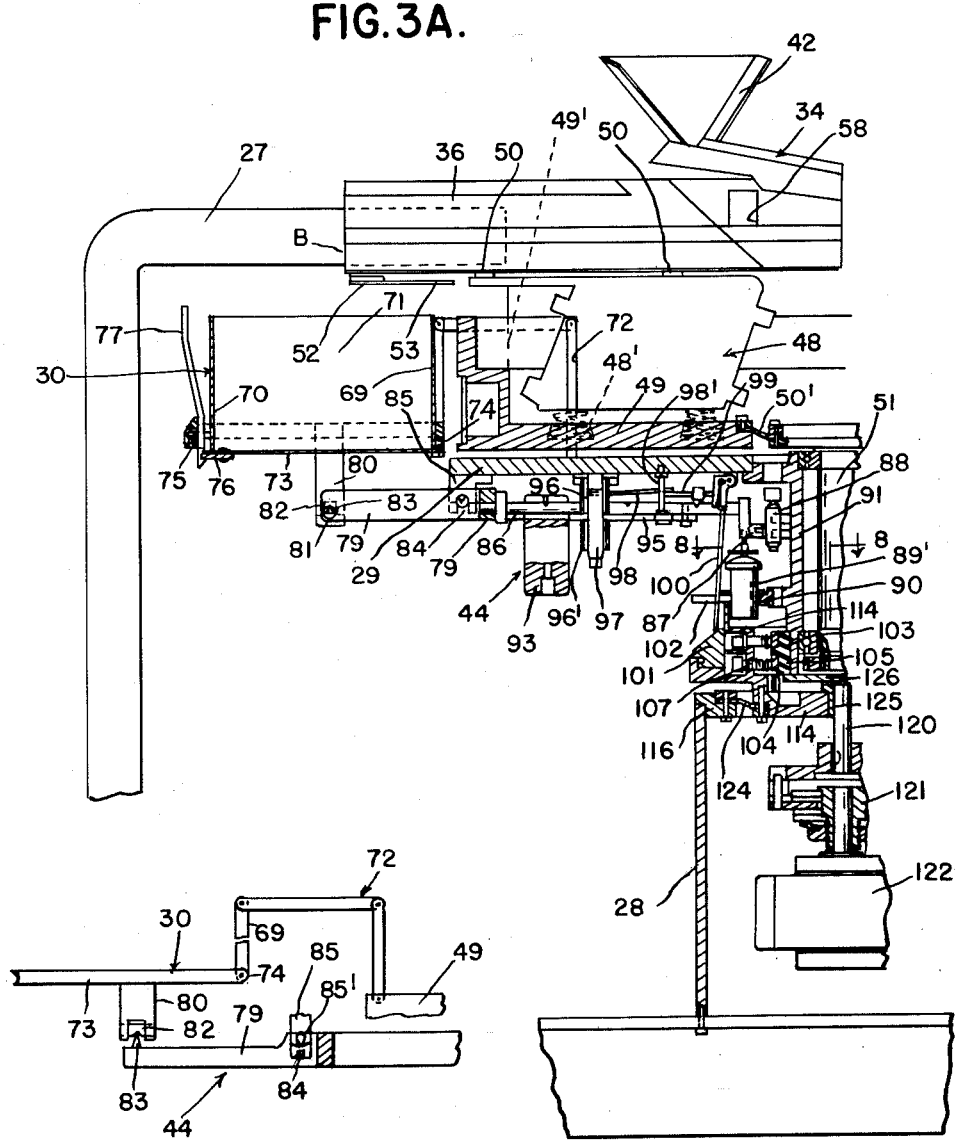

INVENTORS
GUSTAV A. OLOFSSON
BY DONALD W. GARNETT
ATTORNEYS

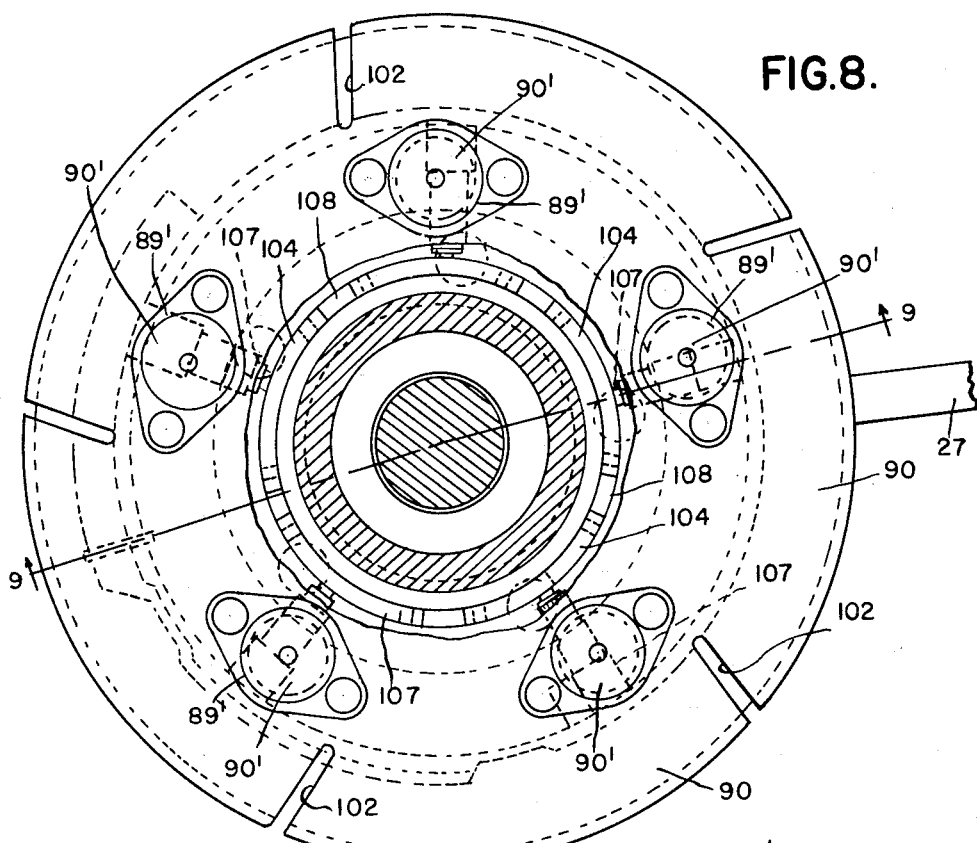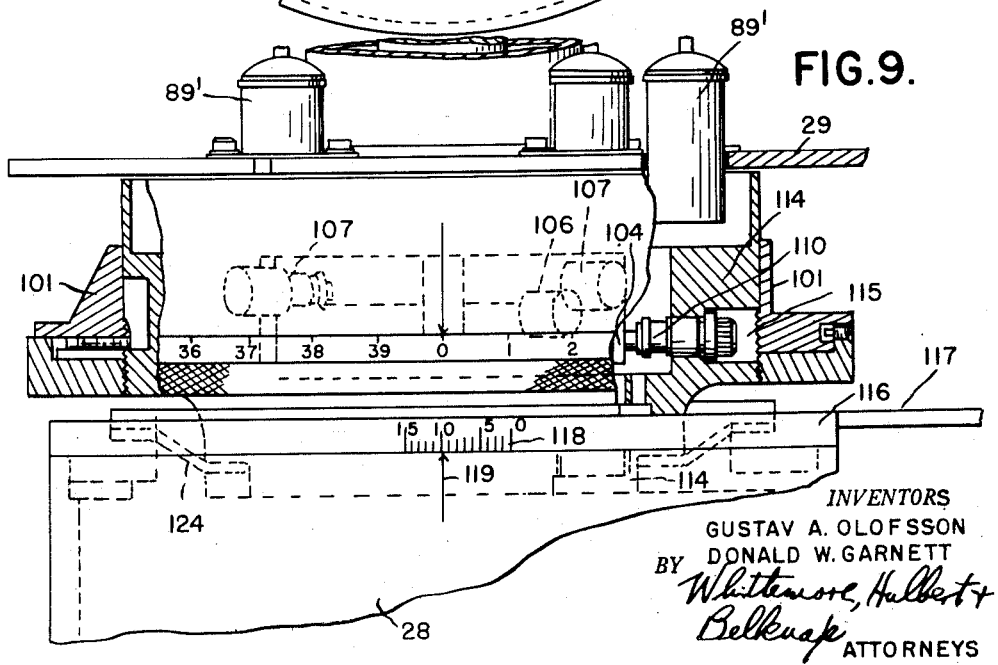

Feb. 13, 1962 G. A. OLOFSSON ETAL 3,020,966
AUTOMATIC WEIGHING MACHINE
Filed Nov. 7, 1955 9 Sheets-Sheet 8

INVENTORS
GUSTAV A. OLOFSSON
DONALD W. GARNETT
BY Whitemore, Hulbert &
Belknap
ATTORNEYS

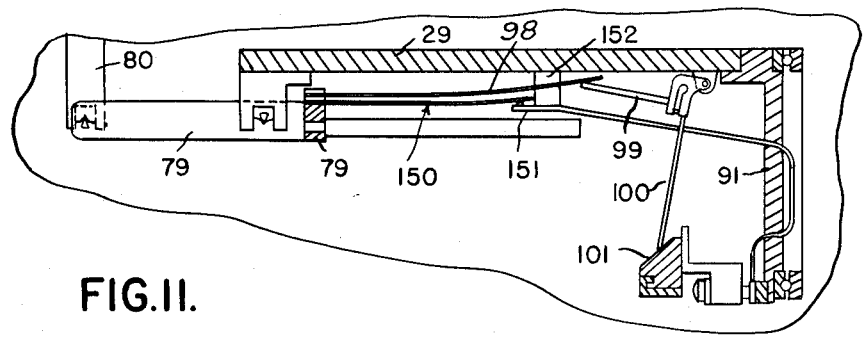
FIG.11.
FIG.12.
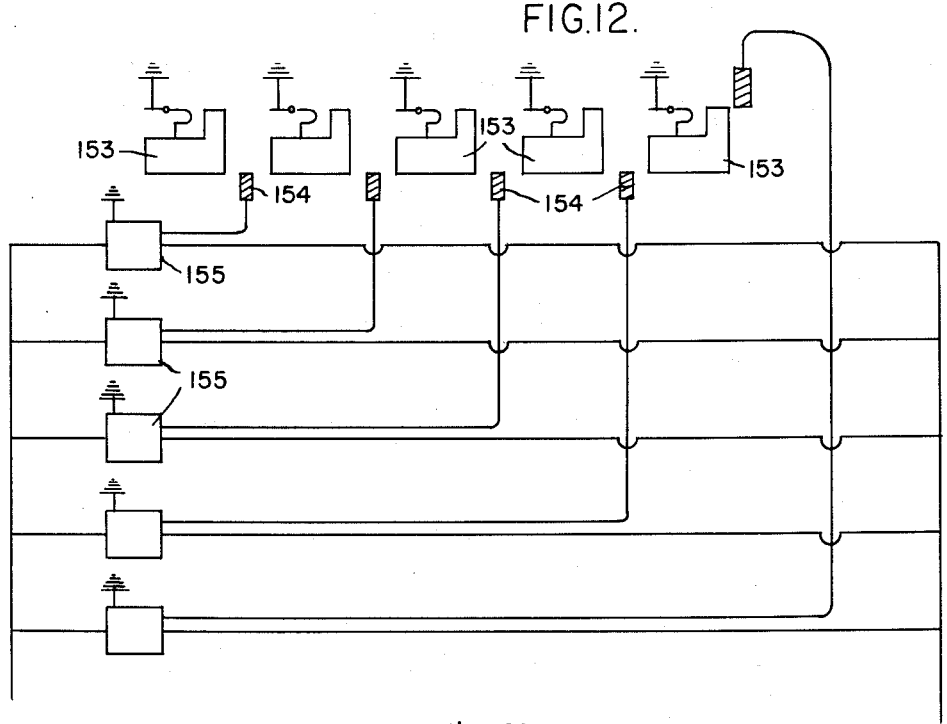
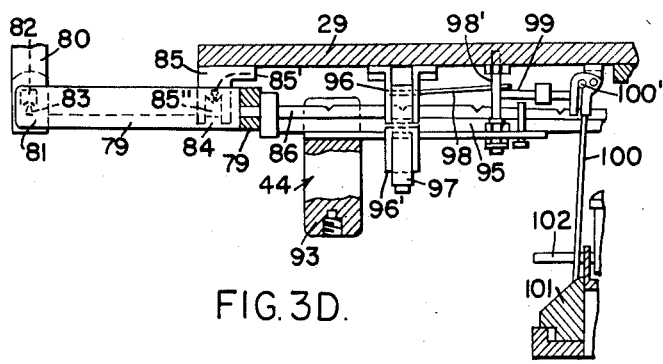
FIG.3D.
INVENTORS
GUSTAV A. OLOFSSON
DONALD W. GARNETT
BY Whittemore, Hulbert &
Belknap
ATTORNEYS

United States Patent Office 3,020,966
Patented Feb. 13, 1962

3,020,966
AUTOMATIC WEIGHING MACHINE
Gustav A. Olofsson, Lansing, and Donald W. Garnett, Grand Ledge, Mich., assignors to The Olofsson Corporation, Lansing, Mich., a corporation of Michigan
Filed Nov. 7, 1955, Ser. No. 545,246
13 Claims. (Cl. 177—61)

The present invention relates to an improved method and machine for automatically weighing and dispensing bulk materials at high speed and with a high degree of accuracy. It is a general object of the invention to provide a method and machine for weighing discrete materials in accordance with a novel principle of successively dispensing and weighing partial increments of the desired total weight at each of a series of material feed stations passed by an appropriate weighing receptacle in its endless travel. In accordance with a refinement of the invention, the amount of material fed to the receptacle at successive feed stations is progressively diminished, with the result that it contains an extremely accurately weighed charge of the material upon arrival at an appropriate disposal zone. All of the operations take place at a high rate of speed of the receptacle, unfailingly without underweight, and especially without appreciable overweight.

Presently available weighing machines designed for high speed commercial operation are commonly set for a discharge of bulk material to be weighed to a receiver at a predetermined lesser weight than that actually to be dispensed from the receiver, as in packaging. Reliance is placed upon the material fed, during creation of a signal after the receiver has reached the preset weight, and during the time required for the signal to interrupt the flow of material to the weigher plus material in suspension, i.e., airborne in passing to the receiver at the time actual interruption of feeding occurs, to bring the amount up to weight. In high speed weighing this amount is considerable. In weighing and dispensing a light-weight material and/or one of non-uniform character as to particle bulk or shape, such as potato chips, the amount of material fed during these inherent delays and that in suspension will vary widely. Therefore, in order to insure that no dispensed charge of such material, as it is packaged directly upon dispensation, will fall below a legally required minimum weight, it is necessary to adjust this type of suspension weighing machine so that an average weight dispensed will be substantially above the legal minimum. This of course represents a substantial wastage. Even then, occasional individual packages may fall below the legal minimum.

Resort has been had heretofore to a so-called "dribble finishing" weighing operation, in which a major portion of the bulk of a required weight is first fed rapidly and weighed roughly, after which the feed is reduced greatly and more accurately weighed to bring it to the desired minimum weight. This principle permits acceptably accurate weighing, and without excessive overweight being dispensed; however, the obvious limitation imposed as to speed of operation makes it impractical for use in a really high speed weighing installation.

Therefore, in accordance with the general object of the invention stated above, we provide an apparatus comprising a travelling series of spaced weighing receptacles of improved type which are progressively supplied with the material to be weighed as they travel in an endless path, and preferably without diminution of their speed of movement, past a series of material feeding devices, also of improved type. Operating connections between the weighing receptacles and respective feed devices insure that the former successively receive from the latter charges of the material in progressively diminishing quantities. That is, a considerable portion of the bulk of the material to be finally dispensed is supplied and weighed as a receptacle passes a first feed device, and progressively lesser quantities are fed out to it as it successively passes the several other feeding devices, i.e., in the order in which the receptacle reaches the respective devices.

A final feeding device passed by the receptacle thus delivers a relatively minute quantity of the material, but sufficient as determined by the weighing operations of the preceding devices to bring the final quantity of material to be dispensed to the desired minimum. After this the receptacle is automatically dumped to a suitable receiver, preferably in the form of a chute leading to a container to be filled in packaging. Thus, it is seen that any wastage which may be represented by material in suspension as a receptacle leaves the final feeder will indeed be insignificant. Yet the possibility of dispensing an underweight is eliminated.

Considered more specifically, it is an object of the invention to provide an improved high speed machine for weighing bulk materials which is entirely automatic in its operation from beginning to end, and to provide a machine having provisions to insure its continuous, accurate and reliable operation without supervision, other than to maintain for it a supply of material to be weighed. To this end provision is made that, in the event that a desired final weight is not present in a receptacle as it passes its final discharge, dispensing or disposal zone, dumping of the receptacle in question will be automatically prevented. The receptacle will then pass through a further weighing cycle, which will be a modified one in respect to its preceding cycle in that initial feed devices at which substantial quantities of material were earlier metered to it are passed without feed. The receptacle in question is brought to the desired weight as to its contents at the final feed device, prior to again reaching the dispensing zone.

The improved machine also features automatic provisions whereby a supply of the bulk material is at all times present at the intake of the respective feed devices. For this purpose, an electronic photo-cell or photoelectric tube type relay causes a master feed-in mechanism to come into operation in the event the requirements of the individual devices are not continuously satisfied. Further possible refinements will appear as the description proceeds.

For the purpose of a brief description of the improved weighing method, as performed by the particular embodiment of the apparatus shown, the latter will be understood to comprise a series of special weighing pans or receptacles, five for example, which are arranged in a circular array and driven continuously in a horizontal rotative path. Each pan is suspended on an accurately adjusted weighing mechanism pivoted on a common rotating support plate. A plurality of separate vibratory type feed devices, for example four, are disposed to discharge at circumferentially spaced stations or zones above the traveling pans, so as to feed material gravitationally into the pans as they pass. The weighing mechanism of each pan is connected through an individual switch and electrical supply and control commutation means to a control relay, which governs the actuation of the particular feed mechanism under which the pan passes at any particular time.

The individual feeding devices are vibrated by electromagnet units operating under a high frequency pulsatory direct current voltage; they terminate their feed of material instantaneously upon being de-energized. The vibratory feed devices are themselves supplied as a group with material to be weighed by a further automatic vibratory feeder of similar character. When energized, this master feed device drops a supply of the bulk material onto a crossing system of the individual feed devices, by which the material is supplied in progressively diminishing volume, as mentioned above, at the successive zones of discharge to the pans. In the interest of fully automatic feeding, a vibratory feeder thus supplying the feed devices is in turn supplied by an automatically operating hopper and conveyor system, which is controlled by relays in a manner similar to the control of the respective electromagnet actuated feed devices. As indicated above, provision is made to reinstitute the operation of all of the feed-in mechanisms, including the automatic feed-in vibratory feeder, if the supply of material to the crossed, electro-magnet actuated feed devices falls short. This is accomplished by a photo-electrically controlled relay device.

As a typical case, let it be assumed that it is desired to weigh out and ultimately discharge a 3-ounce measurement of potato chips. In this instance, the weighing unit for each traveling pan or receptacle will be set so that electrical connections will be made through the switch, commutator and relay provisions referred to above, such that the pan will receive a charge of chips at the first electro-magnet controlled feed station or zone (reached after passing the discharge or dispensing station or zone) amounting to 2½ ounces. When this weight is reached, the operation of the vibratory feed device being passed by the pan is cut off. Simultaneously, a trap or cut-off plate is actuated by a coordinate electrical hook-up, to be described, to prevent any possible further discharge of chips at the zone or station to the pan. With this arrangement of a 3-ounce setting compensated to 2½ ounces, a total of ½ ounce of uncontrolled material may fall without causing overweight.

The pan then moves past a second feed station, and if its weight upon reaching this station is less than, say 2¾ ounces, the operation of the feed device at the second station is initiated and continued until the weight of chips in the pan reaches 2¾ ounces, at which time feeding is discontinued until the pan moves out of that particular feed zone. In this station a total of ¼ ounce of uncontrolled material may fall without causing overweight. If the weight in the pan upon reaching a third zone is less than 2⅞ ounces, for example, the operation of the third feed device will be initiated and continued until the total weight in the pan reaches 2⅞ ounces. In this station a total of ⅛ ounce of uncontrolled material may fall without causing overweight.

Additional chips are feed similarly at the fourth zone if the weight in the pan is less than the predetermined set minimum, i.e., 3 ounces, and feed continues here until the actual weight of chips in the pan amounts to 3 ounces. The delicately set weighing mechanism of the pan then cuts off the feed at the fourth station. Inasmuch as the quantity of chips discharged at this zone is small indeed, in comparison to the feed at other zones, the number of chips in suspension at the time of final cut-off will be inappreciable and ineffective to bring the total weight significantly over the preset minimum.

After the final assessment of the weight as described, the pan moves past the discharge zone, at which it dumps its contents into a discharge chute, assuming the 3-ounce weight is present. If not, i.e., if for any reason the fourth feed operation failed to bring the weight in the pan to the desired 3 ounces, an underweight solenoid comes into operation so that dumping at the discharge station does not take place. The pan then travels again past the first, second and third feed stations, without however, initiating operation of the respective feeding devices at those stations inasmuch as the weight in the pan will no doubt be in excess of the preset weight for each zone. However, the fourth or finishing feed device will again be operated to bring up the load to the desired minimum 3-ounce weight. In practice, the respective weighing mechanisms are all set exactly to the desired ultimate satisfactory figure, such as 3 ounces; the differentials in weight to be established at the respective feed zones are then accomplished by appropriately spring biasing the respective weighing units, as by the use of an appropriate cam. In the fourth station spring compensating is completely removed from the delicately balanced weighing mechanism.

The foregoing as well as other objects will be made more apparent as this description proceeds, especially when considered in connection with the accompanying drawings, wherein:

FIGURE 1 is a perspective view illustrating the improved weighing machine in a general way, including the weighing unit proper and a unit for supplying bulk material to the same.

FIGURE 2 is a further top perspective view showing the provisions for feeding in material to be weighed and the traveling receptacles receiving the material from the feed means.

FIGURES 3A and 3B are complementary fragmentary views in vertical axial section through the weighing unit of the improved machine, illustrating the basic assembly of its major weighing and control parts.

FIGURE 3C is a somewhat schematic view in slightly larger scale than FIGURES 3A and 3B, showing suggested details of a weighing yoke in relation to a weighing pan as incorporated in the machine.

FIGURE 3D is a view similiar to FIGURE 3A, showing only the main weighing components of a weigher of the apparatus.

FIGURE 4 is a top plan view, partially broken away, illustrating the general relationship of certain of the parts appearing in FIGURES 3A and 3B to the feed-in instrumentalities shown in FIGURE 2.

FIGURE 5 is a fragmentary elevational view of the arrangement shown in FIGURE 4.

FIGURE 8 is a view in horizontal section along a line corresponding to line 8—8 of FIGURES 3A and 3B.

FIGURE 9 is a view in vertical section along a line corresponding to the broken line 9—9 of FIGURE 8.

FIGURE 11 is a fragmentary view showing means to perform a preferred method of at-weight signaling.

FIGURE 12 is a partial wiring diagram to be used in the preferred method of at-weight signaling of FIGURE 11.

Figure 3B:
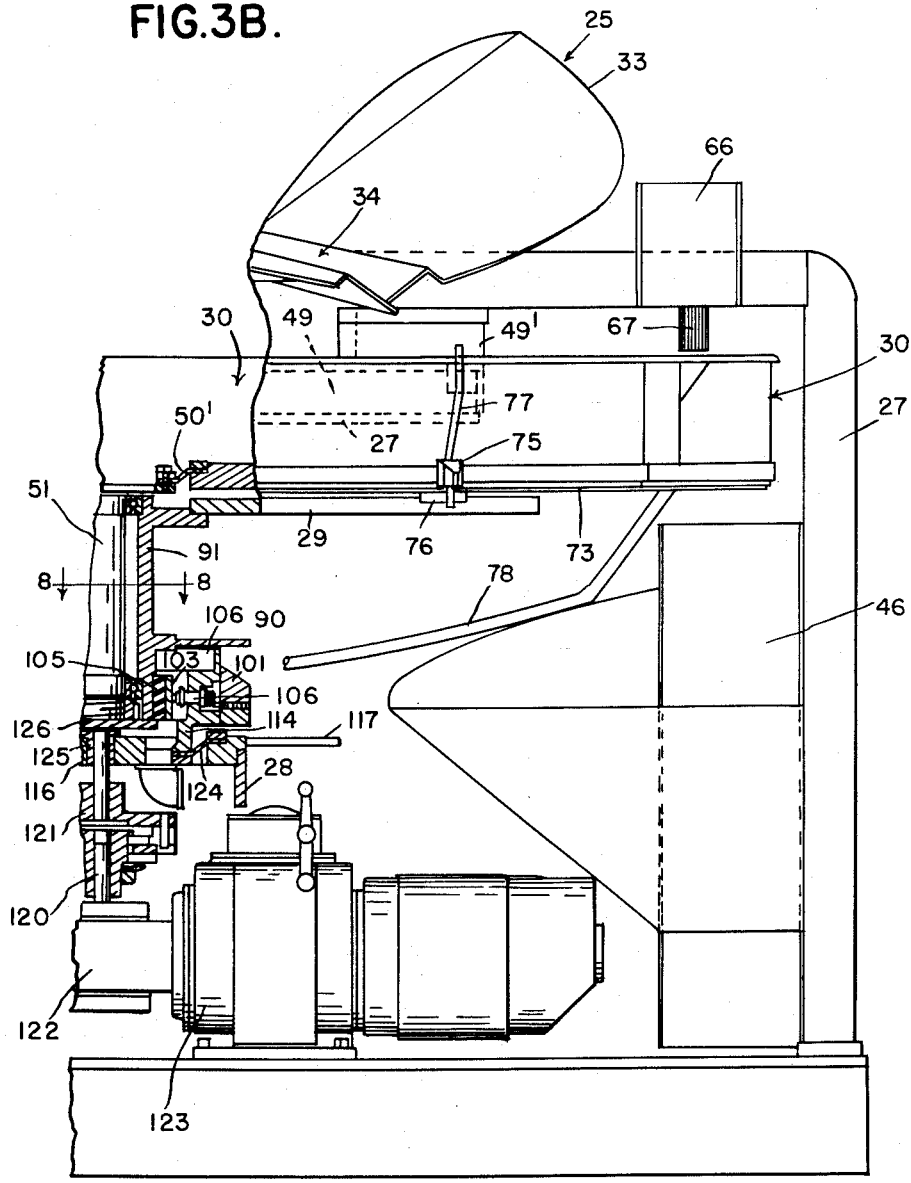

Referring first to FIGURE 1, the reference numeral 10 generally designates the basic weighing unit or apparatus of the improved machine, and the reference numeral 11 generally designates a feed-in apparatus for bulk material, such as potato chips, by which the weighing apparatus 10 is continuously supplied. The weighing and supply or feed-in devices 10 and 11 are closely correlated in their operation, as will appear from the description to follow, particularly in regard to the coordinated control of the operation thereof through the electrical circuit appearing in FIGURE 10 of the drawings. However, as will be clear to those skilled in the art, the particular supply arrangement 11 as hereinafter described may be replaced by other equivalent supply instrumentalities which function in equivalent coordination with the weighing apparatus proper 10.

Figure 10:
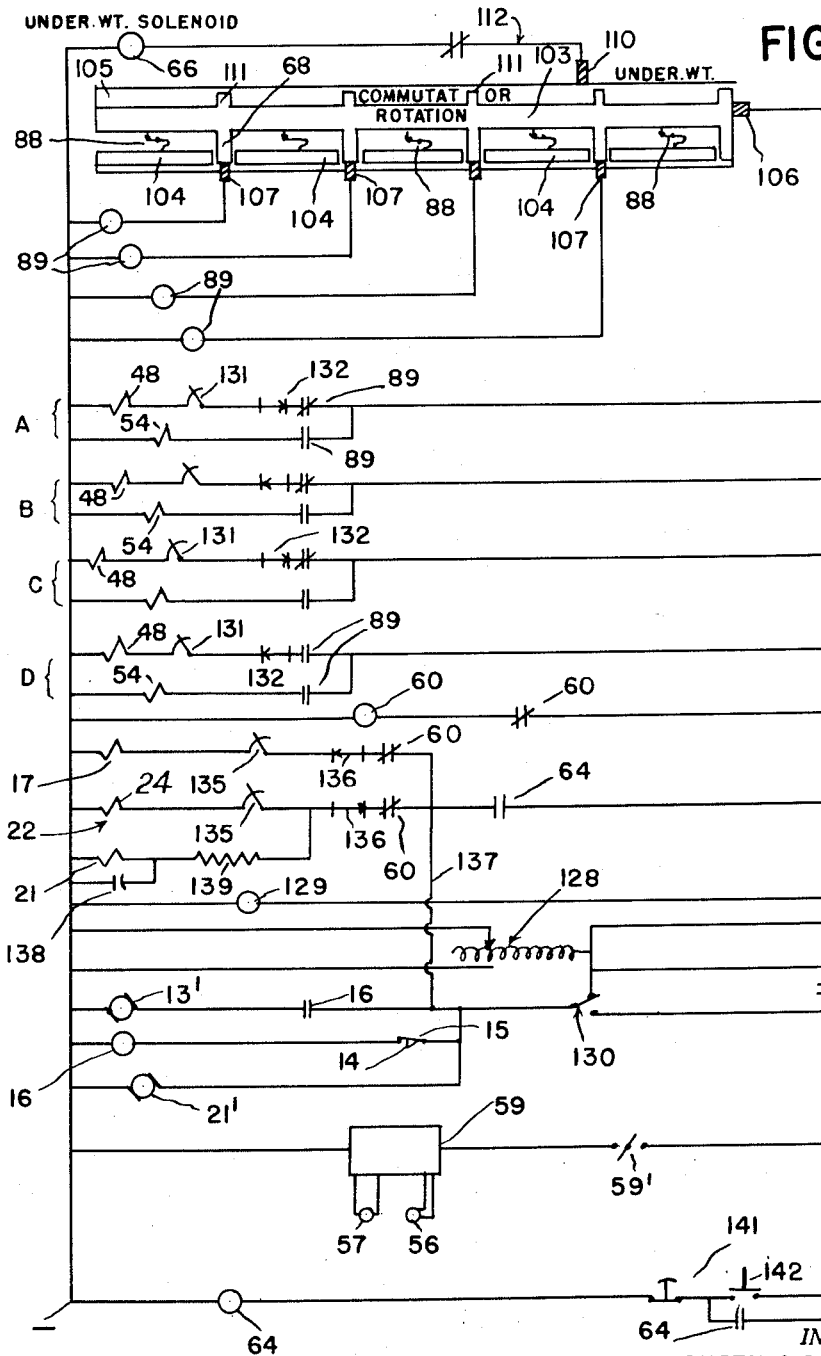
FIGURE 10 is a schematic wiring diagram of a composite nature depicting an electrical control system for the apparatus as a whole.

As illustrated in FIGURE 1, the supply mechanism 11 comprises a suitable large bin 12, the bottom of which is constituted by an appropriate conveyor belt 13 powered by a small electric motor 13'. The belt may be advanced periodically by this means to dump potato chips into a weight-sensitive dump chute 14 (as shown only in FIGURE 10) which is equipped with a limit switch 15 in series with a control relay 16. In the description to follow, and as shown in FIGURE 10, individual contacts or sets of contacts which are actuated by the several relays to be mentioned are conventionally shown and are for simplicity designated in most instances by the same reference numeral as the associated relay. In the case of relay 16, its energization closes an electrical circuit through bin motor 13'.

When the dump chute 14 opens under the weight of the chips it slides them onto a vibratory elevator feed device 17 (FIGURES 1 and 10). The elevator feeder 17, a vibratory device of known type, per se, vibrates an associated chute to feed the chips to the lower end of an endless, motor driven, cleated elevator conveyor belt 18 trained about end pulleys 19 in an upwardly inclined housing 20. The elevator belt 18 discharges at its top to a master weigher feed device or vibratory feeder 22. Power is supplied to belt 18 in response to electrical energization of a clutch 21 (FIGURE 10) connecting the belt with a driving motor 21'.

The vibratory feed units referred to above are of a conventional character embodying a trough or chute 23 which is given an agitated vibratory motion by an electro-magnet or like unit 24 energized by an interrupted D.C. current. Suitable provisions are made to regulate the voltage and amperage supplied to these vibratory feeders, as well as those controlling the further feed of the bulk material, which is sensitively responsive to movement by the vibratory means.

The master weigher vibratory feeder 22 supplies chips, under the control of provisions to be described, to a crossed track type feed unit 25 of the weighing apparatus 10. This apparatus is supported on a sturdy bench-like frame work 26 which is provided with a plurality of upstanding pipe legs or equivalent supports 27, by which the feed unit 25 and other parts associated therewith are fixedly sustained. The frame work 26 also supports the cylindrical housing 28 enclosing drive provisions for a rotary weighing table or plate 29 (see FIGS. 3A, 3B, 6 and 7), which rotary plate carries an annularly arranged series of weighing pans, receptacles or like material receiving members 30 and weighing units associated with each thereof, in a manner to be hereinafter described.

The arrangement of the crossed track feed unit 25 is best illustrated in FIGURES 2, 4 and 5 of the drawings. It consists of a pair of sheet metal segments 32, 33 shaped to provide a pair of large feed troughs 36, 37 which are specially bent for their intended purpose, being mounted under feed chute or trough 23 of vibratory feeder 22; and a pair of individual, crossing feed members or devices 34, 35 are arranged above the feed troughs 36, 37, with their crossing point above, and in approximate vertical alignment with, the center of the axis of rotation of the rotary weighing table or plate 29. The formation of the segments 32, 33 is such as to provide a pair of baffle-like sections 32', 33' on the respective segments which incline mildly downwardly and toward feed troughs 36, 37 respectively. The feed troughs 37, 36, 34, 35 are angularly spaced equally about the center of the machine with a double space between feed troughs 35, 37, as viewed in FIGURES 2 and 4. Feed troughs 34, 35 are inclined mildly downwardly and outwardly.

Figure 6:
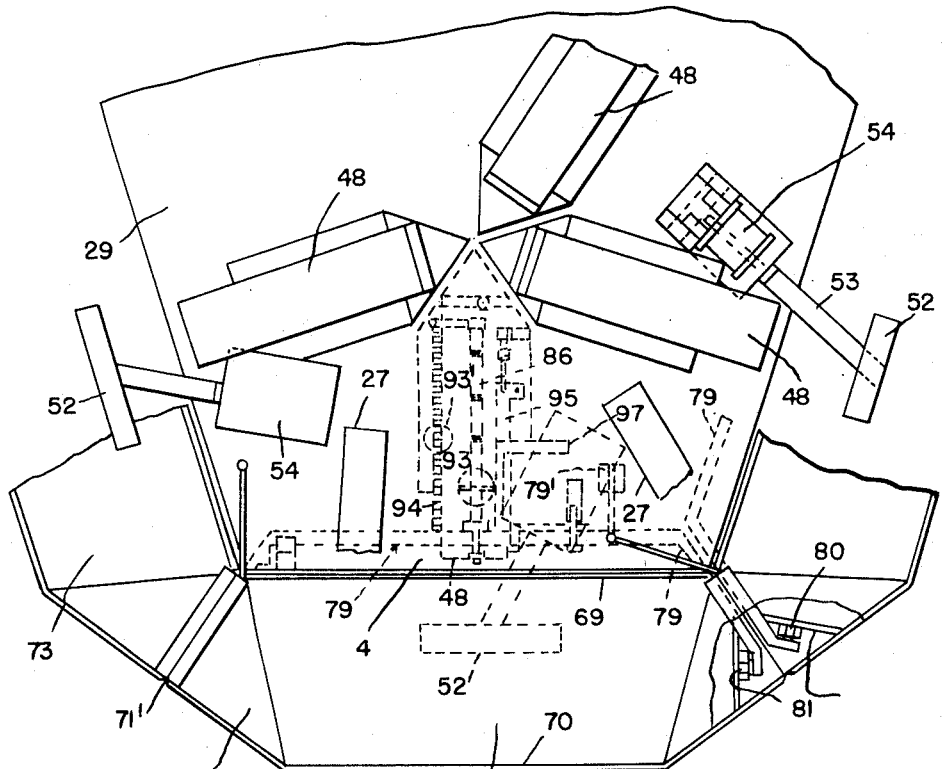
FIGURE 6 is a fragmentary top plan view, partially broken away, further illustrating the relationship of certain vibratory feed devices associated with the feed unit of FIGURE 4 to the weighing units associated with the traveling weighing pans or receptacles.
Figure 7:
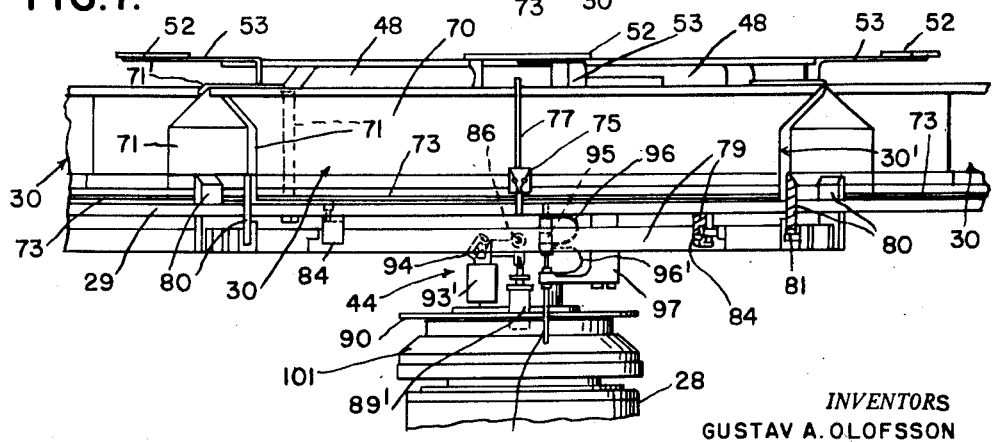
FIGURE 7 is a fragmentary view in side elevation of the parts appearing in FIGURE 6.

The respective upper troughs 34, 35 have rear extensions 38, 39, respectively, the former of which terminates adjacent and immediately below a trough-like extension 40 of restricted width on the feed trough 23 of vibratory feeder 22, this vibratory feeder 22 being appropriately supported on an upstanding post 41 secured to the fixed frame work 26 (FIGURE 1). The extension 39 of trough 35 similarly terminates adjacent and beneath the forward lip of the master vibratory feed chute 23. Extensions 38 and 39 are equipped with flaring rear formations 42 which directly receive small portions of the total quantity of chips issuing from master feed chute 23 when vibratory feeder 22 is energized. The balance, and major portion, of the chips so discharged fall onto the surface of the further feed troughs 36, 37 beneath the troughs 34, 35. Upon agitation of the four troughs 34, 35, 36, 37 by the electro-magnets respectively associated therewith (to be described), chips are caused to travel gravitationally downwardly and outwardly across these troughs, dropping onto a weighing pan 30 therebeneath, the successive agitation of the respective trough-feed devices being under the control of a weighing unit associated therewith, such as is illustrated in FIGURES 3A, 6 and 7 and generally designated by the reference numeral 44. It is to be understood that the quantity of chips which pass the upper crossing feed troughs 34, 35 will constitute a major overflow portion of the chips discharged from master feed vibratory feeder chute 23. The arrangement is such that the greatest quantity of chips will fall into the trough 37, which can be considered to represent a first feed-out station A; a lesser quantity will fall onto the trough 36, considering the same as a second station B reached by the travelling pans 30 after they pass station A; a still lesser amount will be deposited on the uppermost trough 34 as a third feed station C; while the least quantity will be deposited on the lower trough 35 as a fourth and final feed station D.

The proportioning of the amount of fall onto the respective troughs is achieved by an appropriate location of the inner extremities of troughs 36, 37 (stations B and A, respectively) in reference to the vertical discharge zone from master vibratory feed chute 23. Further, the vertical location of the uppermost trough 34 to station C is preferably such that it acts as a level-off blade for chips passing down trough 35 to station D, acting to meter the quantity of chips downwardly traversing trough 35. This further insures a very light outfeed of chips at final station D, prior to arrival of a weighing pan 30 at the receiving station or chute 46 of the apparatus, designated 46. An accurately weighed total weight of chips is dumped into the receiver chute 46 by unlatching a pivoted bottom panel 47 of each of the pans, in a fashion to be described, as the same pass over chute 46. This is always on the assumption that the desired weight, instanced as 3 ounces, is present in the pan at that time. The vertical spacing of the stations A, B, C and D above the pans 30 is slight, so that suspended material falling from station D is negligible.

Now referring to FIGURES 3A, 3B, and 4–7 of the drawings, the reference numeral 48 generally designates a vibratory electro-magnet unit such as is associated with each of the individual chute or troughs 34, 35, 36 and 37. It is in each instance fixedly supported on the frame work 26, by means of a plurality of cushion blocks 48', as by an arrangement such as is shown in FIGURES 3A and 3B, of an annular plate 49 which is fixedly suspended from the upstanding pipe supports 27 of the frame work 26 by means of the blocks 49'. Each feed chute associated with a pulsating electro-magnet 48 is mounted thereon by means of a plurality of blocks 50. An annular, flexible rubber vibration absorbing ring 50' connects the plate 49 internally with the upper end of a fixed pilot post 51 on which the rotating parts to be described are journaled.

The electro-magnets 48 are electrically connected, each through its own control relay, with an automatic switch, both to be described, operatively associated with each weighing pan 30. This is accomplished through suitable commutation provisions. As a pan 30 passes into the zone of any one of the stations A, B, C or D, its switch is open. Its weighing unit 44 as compensated at that zone, indicates the need for chips, and the electro-magnet 48 of the station will be energized to actuate its associated feed trough until the need for additional chips has been satisfied. At this time, the weighing unit 44 closes its switch, the electro-magnet 48 is de-energized, and feed stops at the station in question.

In order to minimize as much as possible the amount of suspended material upon de-energization of the respective electro-magnets 48, the machine is provided with interceptor or trap plates 52, one for each station A, B, C and D, which are adapted to be projected beneath and along the line of outfeed of the respective troughs 34, 35, 36 and 37. They thus intercept the further fall of chips which may be at the lip of the trough at the time of electro-magnet de-energization. Each trap plate 52 is connected by a horizontal bar 53 with the core of a solenoid 54 appropriately supported fixedly by connection with a frame work post 27. The solenoids 54 are controlled co-ordinately with the feed electro-magnets 48, by circuit provisions incorporated in FIGURE 10 of the drawings.

The feed unit 25 of the weighing apparatus 10 also has provisions for the control of master feed vibratory feeder 22, as well as the bin-motor 13' and elevator clutch 21, in order to insure that a continuing supply of potato chips is present at the several individual troughs 34, 35, 36, 37. To this end, and with reference to FIGURES 1, 4 and 5, a standard type photocell detector unit 56 is fixedly mounted on one of the upright supporting posts 27 of the machine frame, and a suitable light source 57 is similarly mounted upon an opposed post 27, being aligned with the photocell 56 across the field of operation of the feed unit 25. The light source and photocell units are so positioned, in the vertical sense, that a light beam from source 57 will pass through window apertures 58 (FIGURE 5 and also FIGURE 3A) in the vibratory feed troughs 36, 37, so that if a supply of chips is not present at these photoelectrically scanned zones, or if the supply is low, the passage of the light beam will cause photocell 56 to energize an electronic relay 59 (FIGURE 10). This in turn energizes a control relay 60 which has contacts in the individual current supply circuits of the elevator vibratory feeder 17 and the master feed vibratory feeder 22. A standard magnetic clutch is also associated with these circuits, this being the clutch 21 controlling the connection of conveyor belt 18 with its motor 21'.

A control relay 64 is provided in these article feed control circuits, by which the machine may be started and stopped in a conventional manner. Likewise, an "on-off" selector switch 59' may be hooked in series with electronic switch 59 to enable the latter to warm up prior to the beginning of the weighing operation.

Referring now to FIGURES 1, 3B and 4, one of the upright posts 27 of the frame work 26 serves as a support for an underweight solenoid 66 positioned above the mouth of receiver chute 46. The movable core of solenoid 66 extends downwardly and carries a cam 67 for effecting the dumping of the weighing pans 30 as they reach the receiver chute 46. Further explanation of the operation of this solenoid and control cam 67 will be made at a later point.

Reference should be made to FIGURES 3A, 3B, and 6-9, for a disclosure of the control provisions which operatively connect the individual weighing pans 30, and the weighing units 44 on which they are pivotally supported, with the electrical operating means of the machine. Each pan 30 is of a shape (as illustrated in FIGURE 6) such that the series of five pans will encircle the periphery of the rotary table or plate 29, on the weighing units of which plate the pans are borne. The inner and outer side walls 69, 70 respectively of each pan 30 are vertical, and the end walls 71 may incline upwardly toward zones at which the successive pans meet with and are overlapped on one another, as indicated at 71'. As so arranged, the pan wall structure is appropriately braced in any desired fashion. A suitable parallel link stabilizer 72 pivoted on the outer periphery of fixed plate 49 and to the upper edge of pan inner wall 69 serves to guide and accommodate limited radial tilt of the pan.

Each pan has a trap door type bottom panel 73 hinged to its inner bottom edge at 74, as shown in FIGURE 3A, and the outer wall of the pan is equipped with a latch 75 which engages a keeper plate 76 on the bottom panel 73 to hold the same in closed position. Each latch has an upwardly extending tappet finger 77 which, in passing the solenoid controlled cam 67 is moved thereby in clockwise direction, as viewed in FIGURE 3A, to release the latch and allow the bottom panel to fall, thereby dumping the weighed contents of the pan 30 into the receiver chute 46. Bottom panel is reclosed by camming engagement with a fixed, upwardly inclined cam rod 78 adjacent chute 46 as the pan 30 departs from the zone of the chute.

However, in the event a proper weight of chips is not present in the pan, as determined by the final weighing operation at station D of the apparatus, the solenoid 66 is energized to retract cam 67, and the tappet finger 77 of the latch in question passes without contact with the cam. In the energization of solenoid 66 as thus described, a circuit is completed by an underweight commutator brush hereinafter referred to.

As illustrated in FIGURES 3A, 3C, and 3D each weighing pan 30 is carried on its individual weighing unit 44 by means of a forked frame or yoke 79. Depending lugs or brackets 80 are provided on the opposite ends of the pan 30, and these brackets are pivotally mounted at 81 by the outer ends of the arms of yoke 79. This mount comprises an inverted V-block 82 pivoted at the lower end of each bracket 80 and an upwardly facing knife edge 83 on the outer end of the fork arm of frame 79. The frame 79 is itself pivoted at 84 by means of a pair of depending brackets 85 adjacent the periphery of rotary table 29, the pivotal connection in this case involving an upwardly facing V-block 85' pivoted on the bracket and a downturned knife edge 85' on the frame arms. Adjustable trimming weights 79' may be provided on yoke or frame 79 as desired (FIGURE 6).

A tare rod 86 extends radially inwardly from the midpoint of the inner cross bar of forked frame 79, and the inner end of the rod 86 is operatively connected through a magnet 87 to a mercury type switch 88 which is opened by the weighing unit and/or its biasing means to be described as the pan 30 enters into the zone of each of the vibratory feed stations A, B, C and D. As the desired weight for each particular station is reached, the pan overcomes the balancing and compensating provisions associated with the tare bar 86, causing the switch 88 to close. This completes a circuit through a commutator supplying current (to be described) and energizes an individual control relay 89 (FIGURE 10) associated with each weighing unit 44.

Appropriate provision is made to compensate each of the weighing units 44, which are originally set arbitrarily to trip their respective switches 88 at the predetermined weight of 3 ounces of chips, so that the pans 30 will instead trip the switches at lower, but successively increasing, weights as the pans pass the respective vibratory feed stations, A, B, C and D. As pointed out above, it is desirable to bias the weighing units 44 so that, for example, the switch 88 of each pan 30 will be closed to de-energize a feed station vibratory feeder when a weight of 2½ ounces is reached at station A, a weight of 2¾ ounces at station B, a weight of 2⅞ ounces at station C, and the full weight of 3 ounces at station D. To this end, an arrangement of a compensating bias spring, variably controlled by a cam in the rotation of the weighing unit, is employed to provide the desired modification of the arbitrary selected weight value at which the feed electro-magnets 48 will be de-energized in the passage of the pans 30 thereunder.

Referring specially to FIGURES 3A, 3D, 6 and 7, the tare rod 86 carries a standard counterweight 93 which may be set arbitrarily by engagement with spaced notches along the rod 86. A further tare bar 94 parallels the rod 86 and extends inwardly from the forked pan supporting frame 79, this rod 94 being suitably calibrated and being adapted to receive the additional counterweight 93' in adjusted positions along its length. These weighting provisions are of more or less conventional character.

A further biasing bar 95 also extends inwardly from the forked pan supporting frame 79 and this bar is associated with a pair of upper and lower looped compensating springs 96, 96' (FIGURES 3A, 3D, 6 and 7). A rigid supporting bracket 97, secured to and depending from the rotary plate 29, supports the lower arm of the lower looped or C-spring 96' at the outer end of that arm, while the upper arm of the lower spring 96' and the lower arm of the upper spring 96 are secured to the bar 95. The upper end of the upper C-spring 96 is clamped to the under surface of the rotary plate 29. Springs 96, 96' afford a cushioned, neutral bias support for bar 95.

A further extension of biasing bar 95 extends inwardly and between two collars on a stud 98' attached to the underside of plate 29. The spacing of these collars controls the stroke of the weighing unit AA in weighing to a reasonable amount.

An inwardly extending leaf spring 98 is carried by bar 95, and serves as a part of the bias or compensating provisions referred to above. The spring 98 is engaged from beneath by a counterweighted tappet arm 99 of angled cam follower rod 100, medially pivoted 100' on the under side of rotary plate 29. The depending arm of rod 100 slides along a fixed but vertically adjustable cam 101 surrounding the axis of rotation of plate 29. The depending arm of the rod 100 is received in an inclined, outwardly opening slot 102 of the fixed plate 90.

The cam 101 is provided with appropriately proportioned rises in the arcuate portions thereof which extend across the respective feed stations A, B and C; hence, as the follower rod 100 engages these rises, which are of progressively decreasing size in the order of the stations mentioned, it is urged less and less clockwise, as viewed in FIGURE 3A. This causes its tappet arm 99 to act upwardly on bias spring 98, and thereby biases the weighing unit 44 by progressively increasing the weight of material required to which it will respond and close the associated switch 88. Zero bias is employed at station D, the weighing unit 44 yielding to a full 3-ounce load of chips at this station.

The compensated, stepped weighing at the respective vibratory feed stations as described permits an initial arbitrary setting of each of the individual weighing units for the desired ultimate weight to be received at a given station. Furthermore, the combination of cushion and biasing springs 96, 96' and 98 permits the counterweight provisions of the weighing unit 44 to sustain the pan at say, 98% of the final required weight, the springs taking control at the final instance gradually moving magnet 87 nearer to the point at which mercury switch 88 will close as the final 2% of weight is fed. In cutting down the increment of movement required for final signaling the effect of pan-yoke inertia is reduced. Thus, the springs increase the sensitivity and rapidity of response of the unit 44. It should be noted here that the initial gap of scale movement required to signal cannot be adjusted too low or the shock from falling material in the early heavy feeds may operate the scale mechanism before final weight is reached.

Actual wiring connections for the respective switches 88 and control relays 89 are shown only in FIGURE 10 of the drawings, to which reference should be made conjointly with other figures mentioned. Current is supplied to switches 88 by means of the rotating commutator bands 103, 104 which are carried on an insulating ring 105 surrounding the rotating sleeve-like support 91 for the table 29 and other instrumentalities. A suitable alternating current potential is continuously fed to the band 103 (FIGURE 3B) through a fixed brush 106, while each of the four relays 89, each controlling one of the stations A, B, C and D, is electrically connected to a brush 107 which is adapted to engage a commutator band 104 in the rotation of the weighing units. It will be noted by reference to FIGURE 10 that there are gaps between the successive band sections 104, and lateral extension segments 108 from the other, continuous commutator band 103 extends into these gaps. This causes the relay vibratory feeder brushes 107 to be shorted out as the transverse segments 108 contact the brushes during the passages of the pans 30 from one feed station to the next.

In the event the weight in any given weighing pan 30 has not reached the desired value upon leaving station D of the vibratory feed unit 25, the solenoid 66 is energized to retract the cam 67, and this energization is initiated through a still further brush 110, an underweight brush which is successively contacted by further lateral extension segments 111 of commutator band 103, as illustrated in FIGURE 10. Since the underweight does not cause the relay 89 to be energized at the last of the stations D, a circuit will be completed through brush 110 and an underweight relay circuit 112 to energize the underweight solenoid 66 and retract cam 67. The tappet finger 77 of that particular pan is therefore not cammed to unlatch its bottom panel 73, and the pan in question passes through another weighing cycle, during which further chips are fed thereto at station D.

The feeding of material to the individual weighing pans 30, especially in the heavier feed stations, and the opening and closing of the bottom panels 73, involve some shock to the individual delicate weighing units 44. To materially absorb this shock energy before it is capable of prematurely moving the magnet 87 to a position where it will close mercury switch 88, oil dampening dashpots 89' of conventional construction are mounted on plate 90 and the dashpot piston 90' of this unit is pivotally connected to the inner end of the tare rod 86.

Details of the structure by which the individual oil dampening dashpots 89' are mounted on plate 90, as well as for mounting other parts and driving the rotatively supported ones are illustrated in FIGURES 8 and 9, considered jointly with FIGURES 3A and 3B. The control cam 101 surrounds a fixed annular plate 114 which has radial recesses 115 receiving the brushes, and the brush mounting assembly is supported in sealed relation to a further, rotatably adjustable supporting plate 116 which is equipped with a projecting hand piece 117, by which the assembly may be turned in relation to the fixed cylindrical housing 28 on which it is supported. This enables the angular position of the cam 101 to be accurately set, as by reference to a calibration 118 on the outer periphery of plate 116 and a base mark 119 on the housing 28, as illustrated in FIGURE 9.

Rotary drive of the table 29 and parts rotating therewith is derived from an upright drive shaft 120 (FIGURES 3A and 3B) which is actuated through a slip coupling 121 from a speed reduction head 122 of an electrical drive motor 123. An annular flexible vibration absorbing member 124 of rubber extends between the mounting plate 116 and the lower extremity of the ring 114 by which the various brushes, cam 101 and other fixed parts of the machine are carried. Drive shaft 120 extends upwardly through a sleeve bearing 125 in member 114, and is connected by means of a top plate 126 to the rotating sleeve member 91.

As illustrated in FIGURE 10, the electrical system of the machine is supplied from a standard alternating current line which feeds an appropriate auto transformer 128. Either manual or automatic voltage control is contemplated, and if manual control is employed, a volt meter 129 is inserted across the line, which meter should be capable of continuous use; and a manually operated switch 130 is also provided to enable the system to be switched from automatic operation in the actual weighing of materials to a non-automatic condition, which will permit operation of the bin conveyor 13 and elevator conveyor independently of the weighing instrumentalities, to enable these units to be periodically cleaned. It is believed that the circuits established by manipulation of switch 130 will be clear from an inspection of FIGURE 10.

The feeding rates of the several vibratory feeders 24 and 48 are quite sensitive to voltage changes; accordingly, suitable variable resistors are included in the individual electro-magnet circuits, which are connected in parallel across the line terminals. As illustrated in FIGURE 10, there are four such similar circuits one for each of the stations A, B, C and D. Each circuit includes a variable resistor 131 and a suitable rectifier 132, which may be a selenium type, in series between the electro-magnet 48 and its control relay 89 to constitute the electro-magnet circuit across the supply line. A further circuit is arranged in parallel to actuate each of the solenoids 54 for the trap plates 52.

The supply circuits for the elevator vibratory feeder 17 and the master weigher vibratory feeder 22 are similarly connected in parallel with one another across the supply line of terminals. Each of these individual circuits includes a variable resistor 135, and a rectifier 136 in series between the electro-magnet and the respective contacts 60, 60 controlling the same. As indicated, the weigher and elevator electromagnet circuits are connected by a lead 137 to the switch 130 for energization independently of the weighing units 44 in the cleaning of the apparatus. The further start-stop control relay 64 completes the elevator-weigher electro-magnet circuits across the supply line. The motor coupling clutch 21 is controlled by a circuit including a filter condenser 138 and a suitable resistor 139. The coil of relay 64 is connected in series across the voltage supply line with a master start-stop switch 141, the "start" contactor 142 of the switch 141 being shunted by a contactor of relay 64.

In operation, assuming that bulk material, such as potato chips, is present in bin 12, and that the switch 130 is positioned for automatic weighing operation, i.e., in the position shown in FIGURE 10, the closing of switch 142 will initiate operation of the basic units 10, 11 of the machine. Conveyor belt 13 operates to forward material to the weight-sensitive dump chute 14, the limit switch 15 and control relay 16 maintaining a supply of material thereon. Dump chute 14 slides the material to the elevator vibratory feeder 24, which proceeds to feed the lower end of the elevator conveyor belt 18. Elevator belt 18 discharges the chips at its upper end to the master weighing vibratory feeder 22.

If the feed unit 25 of the machine lacks an adequate supply of chips, as determined by the scanning operation performed by the electronic switch which is constituted by the photocell unit 56 and light source 57, the energization of photocell 56 will in turn energize weigher vibratory feeder 22. The actuation of the relay 60 associated with vibratory feeder 22 results in energization of the elevator vibratory feeder 17, and clutch 21 along with the electromagnetic vibratory unit 24 of the weigher vibratory feeder 22. The supply of chips in the dump chute 14 is thus forwarded by the instrumentalities described to the feed unit 25, and is distributed to the vibratory feeder troughs 34, 35, 36 and 37 of the several feed stations of the unit 10.

The traveling weighing pans 30 pass in succession beneath the outer discharge ends of the vibratory feeder troughs 37, 36, 34 and 35 of the respective stations A, B, C and D. The biasing of the weighing units 44 of three of the pans 30 is progressively effected through the agency of the fixed circular cam 101 as the depending tappet extensions of the biasing members 100 travel over the respective rises of cam 101 in the rotation of plate 29. Thus, the spring 98 will be urged by tappet arm 99 in a direction to increasingly offset slightly the weight of the counterpoise members of the scale unit 44 as the pans 30 pass the first three feed stations A, B and C. A supply of chips will be fed onto feed-out trough 37 at station A which falls predeterminedly short of the desired ultimate weight, for example, 2½ ounces, the weighing unit 44 passing station A being offset to the extent of ½ ounce by the provisions described. In passing the trough 36 at station B, the electro-magnet 48 actuating this trough will operate until the weight has been increased a predetermined further amount, for example up to 2¾ ounces. As in the case of station A, the weighing unit 44 will close switch 88 and energize relay 89, terminating the operation of the electro-magnet 48 at station B when the weight has reached the stated value, as compensated by the bias means described.

The pan 30 then passes beneath station C, where the electro-magnet 48 associated with that station is similarly controlled to terminate the further feed of chips to the pan when the weight has been built up to, say, 2⅞ ounces, again as compensated by the biasing. The pan next passes station D, at which time cam 101 exerts no biasing function, the weighing unit 44 then causing feeding until the weight has been increased to the preset desired value, i.e., 3 ounces. The amount of material fed out at station D will be very slight so that any chips dropped following the de-energization of electro-magnet 48 at station D will be negligible.

The properly loaded pan 30 now passes into the discharge zone of the machine at chute 46 whereupon the tappet finger 77 of its latch 75 engages and is cammed inwardly by the cam 67, controlled by solenoid 66. This drops bottom panel 73 of the pan 30, dumping the desired weight of chips into the chute 46, by which it is forwarded for packaging.

In the event an inadequate supply of chips is present in any pan 30 as it leaves station D, the control relay 89 of that pan will remain de-energized, inasmuch as its associated switch 88 has not closed. The underweight control brush 110 is contacted by a commutator segment 111. This energizes the underweight control relay 112, in turn energizing the underweight solenoid 66, which causes the cam 67 to be elevated and allow the tappet finger 77 of latch 75 to pass without actuation. The electro-magnet relay of station D is shorted out as the segment 108 passes the brush 107. The shorting out of each of the electro-magnet control brushes 107 as the pans 30 pass from station to station insures the stopping of the feed of chips during this brief interval.

A preferred method of signaling that weighing pan 30 is up to the preset weight desired in any station is shown in FIGURE 11. Compensating loop springs 96, 96' and mounting brackets 97 are here replaced by a single leaf spring 150 attached to supporting frame or yoke 79 at its outer end. Its radially inwardly extending end rests on an electrical contact 151 mounted on insulating block 152 on plate 29, urging the weighing unit 44 in a counterclockwise direction. As material is fed to weighing pan 30 above, say 98% of the desired weight, the weighing unit 44 begins to rotate counterclockwise as urged by weight in weighing pan 30 and by leaf spring 150, thus leaving the bottom stop of stroke limiting member 98'. Adjustment of electrical contact 151 is so made that at approximately midstroke of the weighing unit leaf spring 150 leaves electrical contact 151, thus signaling through its respective commutator segment 153 (FIGURE 12) and associated brushes 154 to an electronic relay 155 of conventional design.

It will be noted that with this preferred system in the case of the finish feeding station D, and when checking for underweight, the up-to-weight signal is generated when the weighing mechanism 44 is free of all springs, while still maintaining a spring biasing method of cutting down the effect of receptacle-yoke inertia up to 100% of weight. The finish weight is therefore checked when free from springs which are subject to inherent changes in fatigue and age during use.

It is evident that we have provided a high speed weighing machine for bulk material which is entirely automatic in its operation, requiring little or no attention after the initiation of its operation. A very accurate charge of weighed material is insured to arrive at the receiving chute 46, and the wastage represented in previous machines by material fed during inherent falling delay in signal response and in suspension is eliminated. By the same token, the operation of our improved machine takes place at a far higher rate of speed than has been possible in machines which operate on the so-called "dribble" principle. An actual installation of the machine has operated at a speed of 52 complete weighing operations per minute with entirely satisfactory results from a commercial standpoint in weighing up to 150,000 bags of potato chips.

The drawings and the foregoing specification constitute a description of the improved weighting machine in such full, clear, concise and exact terms as to enable any person skilled in the art to practice the invention, the scope of which is indicated by the appended claims.

What we claim as our invention is:

1. Apparatus for the high speed weighing of bulk material, comprising a continuously travelling support, a plurality of weighing units arranged in succession on said support in the direction of travel thereof, a weighing receptacle carried by each of said weighing units, a switch operatively connected with each of said weighing units and operated by the latter in accordance with the weight of material in said receptacle, a plurality of electrically actuated vibratory feed devices arranged in succession along the path of travel of said receptacles and operative when actuated to discharge material to said receptacles, actuating circuitry for said feed devices including commutator means electrically connected to said respective feed devices and to said switches to electrically energized and de-energize, and thereby control actuation of, said feed devices in response to operation of said respective switches, as determined by the increasing weight of material in said respective receptacles, and means to predeterminedly counterbalance said respective weighing receptacles under diminishing increments of added force in their order of travel past said devices to cause actuation of the respective switches in response to progressively decreasing feeds of material from said feed devices to said receptacles.

2. Apparatus for weighing bulk material, comprising a traveling support conveying a plurality of weighing units, an article receptacle carried by each weighing unit, each of said units comprising a bar member on which a receptacle is supported, means pivotally supporting said bar member on said traveling support for travel therewith, counterweight means predeterminedly biasing said bar member pivotally in one direction during said travel to predeterminedly counterbalance the weight of the same and the receptacle, and a compensating device operatively connected to said bar member and operative thereon in the travel of said support to pivotally bias said bar member in the opposite direction and predeterminedly diminish the counterbalancing effect of said counterweight means, said compensating means comprising a tappet movably mounted on said support, and a fixed cam engaged by said tappet in the travel of said support.

3. Apparatus for weighing bulk material, comprising a traveling support conveying a plurality of weighing units, an article receptacle carried by each weighing unit, each of said units comprising a bar member on which a receptacle is supported, means pivotally supporting said bar member on said traveling support, counterweight means predeterminedly biasing said bar member pivotally in one direction, and a compensating device associated with said bar member and operative in the travel of said support to pivotally bias said bar member in the opposite direction, said compensating means comprising a tappet movably mounted on said support, a spring operatively connecting said tappet with said bar member, and a fixed cam engaged by said tappet in the travel of said support to effect biasing of said bar member through said spring.

4. Apparatus for automatically weighing bulk material at high speed, comprising a continuously traveling support conveying a plurality of receptacles, a weighing unit for each of said receptacles mounting the same in a series on said support, a plurality of individual feed devices spaced along the path of travel of said receptacles and in a relation to the latter to discharge material to said receptacles as the same pass said devices, said units including means counterbalancing the respective receptacles under diminishing increments of added force in the order of their successive travel past said devices, means controlled by said means to individually actuate said feed devices for said discharge, including an individual control system operatively connecting each of said weighing units with said actuating means for said respective feed devices, thereby to cause actuation of said respective devices as determined by the weight of material in a receptacle as it passes a feed device, said first named means including means to apply resilient and variable bias to said receptacles at said respective feed devices to determine the weight causing said actuation.

5. Apparatus for automatically weighing bulk material at high speed, comprising a continuously traveling support conveying a plurality of receptacles, a weighing unit for each of said receptacles mounting the same in a series on said support, a plurality of individual feed devices spaced along the path of travel of said receptacles and in a relation to the latter to discharge material to said receptacles as the same pass said devices, said units including means counterbalancing the respective receptacles under diminishing increments of added force in the order of their successive travel past said devices, means controlled by said means to individually actuate said feed devices for said discharge, including an individual control system operatively connecting each of said weighing units with said actuating means for said respective feed devices, thereby to cause actuation of said respective devices as determined by the weight of material in a receptacle as it passes a feed device.

6. Apparatus for automatically weighing bulk material at high speed, comprising a continuously rotating support, a plurality of weighing receptacles conveyed thereby, a weighing unit for each of said receptacles mounting the same in a series on said support, a plurality of individual feed devices spaced along the path of travel of said receptacles and in a relation to the latter to discharge material to said receptacles as said receptacles pass said devices, said units including means counterbalancing the respective receptacles under diminishing increments of added force in the order of their successive travel past said devices, and means operatively connecting each of said weighing units with said respective feed devices to cause actuation of said respective devices as determined by the weight of material in a receptacle as it passes a feed device, said first named means including means operatively connected to at least two of said receptacles to apply resilient and variable bias thereto and thus compensate the same in respect to weight.

7. Apparatus in accordance with claim 6, in which said compensating means includes a leaf spring actuable to adjustably counterpoise one of said two weighing units and cause said two units to initially respond to different weights.

8. Apparatus in accordance with claim 6, in which said compensating means includes a leaf spring actuable to adjustably counterpoise one of said two weighing units and cause said two units to initially respond to different weights, and means automatically actuating said spring in the rotation of said receptacle support.

9. Apparatus for the high speed weighing of bulk material, comprising a continuously traveling support, a plurality of weighing units arranged in succession on said support in the direction of travel thereof, a weighing receptacle carried by each of said weighing units, a switch operatively connected with each of said weighing units and operated by the latter in accordance with the weight of material in said receptacle, a plurality of electrically actuated vibratory feed devices arranged in succession along the path of travel of said receptacles and operative when actuated to discharge material to said receptacles, said units having means to counterbalance their respective receptacles under diminishing increments of added force in the order of their advance past said devices, and actuating circuitry for said feed devices including commutator means electrically connected to said respective feed devices and to said switches to electrically energize and de-energize, and thereby control actuation of, said feed devices in response to operation of said respective switches, as determined by the increasing weight of material in said respective receptacles.

10. Apparatus for automatically weighing bulk material at high speed to a predetermined weight, comprising a continuously traveling support conveying a plurality of receptacles, a weighing unit for each of said receptacles mounting the same in a series on said support, a plurality of individual feed devices spaced along the path of travel of said receptacles and in a relation to the latter to discharge material to said receptacles as the same pass said devices, said units including means counterbalancing the respective receptacles under diminishing increments of added force in the order of their successive travel past said devices, means controlled by said counterbalancing means to individually actuate said feed devices for said discharge, and means to discharge the contents of said receptacles at said predetermined weight, including a movable bottom for each receptacle, and means controlled by the latter, as weighed to said predetermined weight, to move said bottom to dump said contents.

11. Apparatus for automatically weighing bulk material at high speed to a predetermined weight, comprising a continuously traveling support conveying a plurality of receptacles, a weighing unit for each of said receptacles mounting the same in a series on said support, a plurality of individual feed devices spaced along the path of travel of said receptacles and in a relation to the latter to discharge material to said receptacles as the same pass said devices, said units including means counterbalancing the respective receptacles under diminishing increments of added force in the order of their successive travel past said devices, means controlled by said counterbalancing means to individually actuate said feed devices for said discharge, said first named means including means to apply resilient and variable bias to said receptacles at said respective feed devices to determine the weight causing said actuation, and means to discharge the contents of said receptacles at said predetermined weight, including a movable bottom for each receptacle, and means controlled by the latter, as weighed to said predetermined weight, to move said bottom to dump said contents.

12. Apparatus for automatically weighing bulk material at high speed to a predetermined weight, comprising a continuously traveling support conveying a plurality of receptacles, a weighing unit for each of said receptacles mounting the same in a series on said support, a plurality of individual feed devices spaced along the path of travel of said receptacles and in a relation to the latter to discharge material to said receptacles as the same pass said devices, said units including means counterbalancing the respective receptacles under diminishing increments of added force in the order of their successive travel past said devices, means controlled by said counterbalancing means to individually actuate said feed devices for said discharge, including an individual control system operatively connecting each of said weighing units with said actuating means for said respective feed devices, and means to discharge the contents of said receptacles at said predetermined weight, including a movable bottom for each receptacle, and means controlled by the latter, as weighed to said predetermined weight, to move said bottom to dump said contents.

13. Apparatus for automatically weighing bulk material, comprising a traveling support, a plurality of receptacles conveyed by said support, a weighing unit operatively connected to each of said receptacles, said respective receptacles and units having means mounting the same in a series on said support, a plurality of individual vibratory feed devices mounted in relation to said receptacles to discharge material to the latter during the travel thereof, said feed devices each having means to vibrate the same for the discharge of material therefrom, said weighing units including means counterbalancing the respective receptacles under diminishing increments of added force, and means controlled by said last named means to individually actuate said vibrating means of said respective feed devices for said discharge, including an individual control system operatively connecting each of said weighing units with said vibrating means for said feed devices, said first named means including means to apply resilient and variable bias to said receptacles at said respective feed devices to determine the weight causing said actuation.

References Cited in the file of this patent

UNITED STATES PATENTS

| | | |
|---|---|---|
| 733,096 | Tyler | July 7, 1903 |
| 765,676 | Phillips | July 26, 1904 |
| 767,394 | Doble | Aug. 16, 1904 |
| 1,149,079 | Popow | Aug. 3, 1915 |
| 1,228,927 | Jaenichen | June 5, 1917 |
| 1,300,274 | Jeffries et al. | Apr. 15, 1919 |
| 1,470,010 | Hopkinson | Oct. 9, 1923 |
| 1,827,048 | Stimpson | Oct. 13, 1931 |
| 1,864,545 | Marsh | June 28, 1932 |
| 2,058,775 | Cundall | Oct. 27, 1936 |
| 2,198,788 | Popov | Apr. 30, 1940 |
| 2,273,330 | Robinson | Feb. 17, 1942 |
| 2,544,210 | Zenke et al. | Mar. 6, 1951 |
| 2,549,704 | Noble | Apr. 17, 1951 |
| 2,680,012 | Bozoian | June 1, 1954 |
| 2,699,891 | Kellicott | Jan. 18, 1955 |
| 2,733,911 | Thurston | Feb. 7, 1956 |
| 2,751,180 | Howard | June 19, 1956 |
| 2,762,290 | Moss et al. | Sept. 11, 1956 |
| 2,787,436 | Reynolds | Apr. 2, 1957 |

FOREIGN PATENTS

| | | |
|---|---|---|
| 492,634 | Great Britain | Sept. 23, 1938 |